United States Patent
Noguchi et al.

(10) Patent No.: US 7,990,560 B2
(45) Date of Patent: Aug. 2, 2011

(54) IP COMMUNICATION APPARATUS, IP COMMUNICATION SYSTEM, AND DATA TRANSMISSION METHOD THEREOF

(75) Inventors: Yoshihiro Noguchi, Fukuoka (JP); Kazuto Kobayashi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 708 days.

(21) Appl. No.: 12/132,125

(22) Filed: Jun. 3, 2008

(65) Prior Publication Data

US 2008/0297846 A1 Dec. 4, 2008

(30) Foreign Application Priority Data

Jun. 4, 2007 (JP) ................................ 2007-148360

(51) Int. Cl.
*G06F 3/12* (2006.01)
*H04N 1/00* (2006.01)

(52) U.S. Cl. .. 358/1.15; 358/400; 358/407; 379/100.01; 379/100.06

(58) Field of Classification Search .................. 358/1.15, 358/400, 404, 407, 434, 435, 436, 437, 438, 358/442; 379/100.01, 100.06, 100.09
See application file for complete search history.

(56) References Cited

U.S. PATENT DOCUMENTS

| | | | |
|---|---|---|---|
| 7,111,068 | B2 | 9/2006 | Akimoto et al. |
| 2002/0019876 | A1 | 2/2002 | Akimoto et al. |
| 2002/0051221 | A1 | 5/2002 | Wakabayashi |
| 2002/0118398 | A1* | 8/2002 | Tanimoto ...................... 358/407 |
| 2004/0097188 | A1* | 5/2004 | Tanimoto ...................... 455/3.06 |
| 2005/0141485 | A1 | 6/2005 | Miyajima et al. |
| 2005/0141529 | A1 | 6/2005 | Miyajima et al. |
| 2005/0141530 | A1 | 6/2005 | Miyajima et al. |
| 2006/0077983 | A1 | 4/2006 | Miyajima et al. |
| 2007/0127455 | A1* | 6/2007 | Fujioka ......................... 370/356 |
| 2008/0052766 | A1* | 2/2008 | Esperet et al. .................... 726/3 |
| 2008/0247386 | A1* | 10/2008 | Wildfeuer ..................... 370/355 |
| 2008/0253358 | A1* | 10/2008 | Furukawa et al. ............. 370/352 |
| 2008/0285554 | A1* | 11/2008 | Noguchi ....................... 370/389 |
| 2009/0222874 | A1* | 9/2009 | White et al. .................. 725/118 |

FOREIGN PATENT DOCUMENTS

JP 2002-49571 2/2002

OTHER PUBLICATIONS

English language Abstract of JP 2002-49571, Feb. 15, 2002.

* cited by examiner

*Primary Examiner* — Jerome Grant, II
(74) *Attorney, Agent, or Firm* — Greenblum & Bernstein, P.L.C.

(57) ABSTRACT

An IFAX has a call controller that transmits and receives a SIP message to and from a destination apparatus via a SIP server, a file transmitter/receiver that transmits and receives image data to and from a Web server, and a communication manager that exchanges information for managing the image data transfer to and from the destination apparatus, by adding predetermined information to the SIP message. Thereby, the IFAX transfers the image data via the Web server while performing SIP-based communication with the destination apparatus.

7 Claims, 12 Drawing Sheets

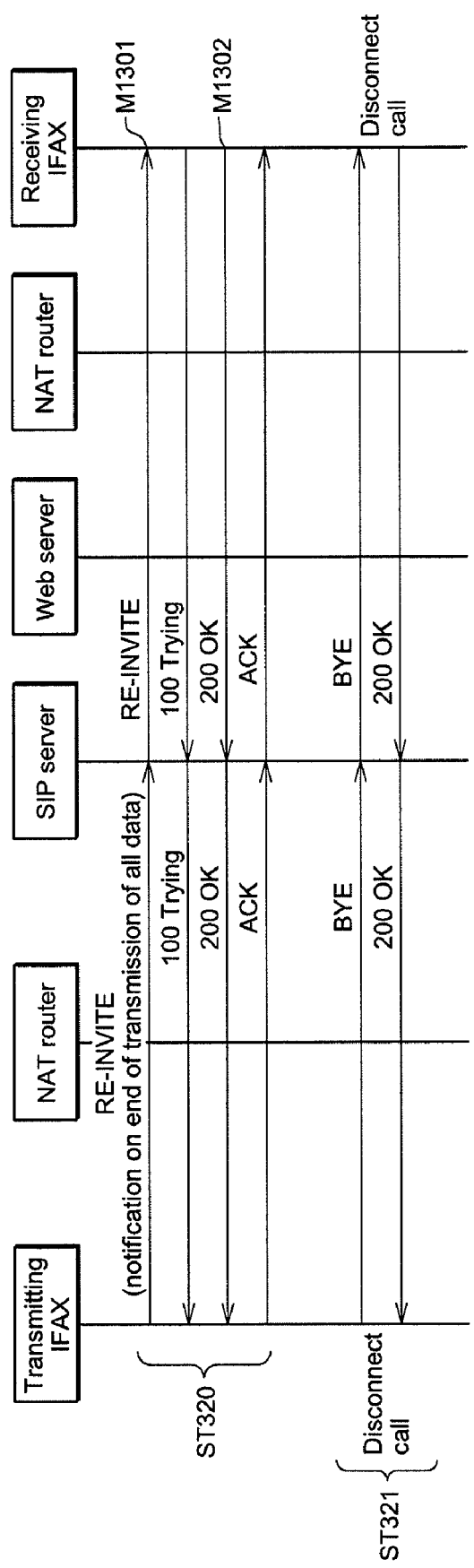

INVITE sip:123456@192.168.20.10 SIP/2.0
Max-Forwards: 70
To: sip:123456@192.168.20.10
From: sip:123456@192.168.20.10;tag=3447165558
Call-ID: d793b011-7348bd9dc8ee1371ca940080f082399c@192.168.20.20
CSeq: 1 INVITE
Contact: <sip:123456789@192.168.20.20:5060;user=phone:transport=tcp>
Content-Type: application/sdp
Content-Length: 281
v=0
o=- 1167609649 1167609649 IN IP4 192.168.20.20
s=ifax1
c=IN IP4 192.168.20.20
t=0 0
m=audio 16000 RTP/AVP 0 2 18          ⎫
a=rtpmap:0 PCMU/8000                  ⎬ 32    ⎫
a=rtpmap:2 G726-32/8000               ⎭       ⎬ 31
a=rtpmap:18 G729A/8000                        ⎟
m=image 80 http tcp                   ⎫       ⎟
a=iso_a4 iso_b4 tiff b/w              ⎬ 33    ⎭
a=url www.ifax.com                    ⎟
a=mailaddress ifax1@www.ifax.com      ⎭
```

SIP/2.0 200 OK
To: sip:123456@192.168.20.10
From: sip:123456@192.168.20.10;tag=3447165558
Call-ID: d793b011-7348bd9dc8ee1371ca940080f082399c@192.168.20.20
CSeq: 1 INVITE
Contact: sip:123456789@192.168.20.20:5060
Content-Type: application/sdp
Content-Length: 165
v=0
o=- 1167609649 1167609649 IN IP4 192.168.20.20   ⎫
s=SIP-FAX                                        ⎟
c=IN IP4 192.168.20.20                           ⎬ 34
t=0 0                                            ⎭
m=image 80 http tcp           ⎫
a=iso_a4 tiff b/w             ⎬ 35
```

Fig.9

```
v=0
o=- 1167609649 1167609649 IN IP4 192.168.20.20
s=ifax1
c=IN IP4 192.168.20.20
t=0 0
m=image 80 http tcp
a=iso_a4 tiff b/w
a=sendstatus start
```

```
v=0
o=- 1167609649 1167609649 IN IP4 192.168.20.20
s=SIP-FAX
c=IN IP4 192.168.20.20
t=0 0
m=image 80 http tcp
a=iso_a4 tiff b/w
a=sendstatus wait60
```
} 61
} 62

Fig.11

```
v=0
o=- 1167609649 1167609649 IN IP4 192.168.20.20
s=ifax1
c=IN IP4 192.168.20.20
t=0 0
m=image 80 http tcp
a=iso_a4 tiff b/w
a=sendstatus done
```

M1301, 71, 72

IP COMMUNICATION APPARATUS, IP COMMUNICATION SYSTEM, AND DATA TRANSMISSION METHOD THEREOF

CROSS-REFERENCE TO RELATED APPLICATIONS

The present application claims priority under 35 U.S.C. §119 of Japanese Application No. 2007-148360 filed on Jun. 4, 2007, the disclosure of which is expressly incorporated by reference herein in its entirety.

BACKGROUND OF THE INVENTION

1. Field of the Invention

The present invention relates to an IP communication apparatus that performs communication over an IP (Internet Protocol) network, an IP communication system, and a data transmission method thereof.

2. Description of Related Art

Conventionally known methods of facsimile communication via a network, such as the Internet and the like, include a method for transmitting image data as a file attached to an e-mail based on SMTP (Simple Mail Transfer Protocol) (ITU-T T.37 standard). However, due to port 25 blocking (a use restriction on port 25 that is generally assigned for sending e-mails) performed by providers in recent years as a countermeasure to mass distribution of unsolicited emails, the facsimile communication using an e-mail system is inconveniently restricted.

A communication controlling apparatus, for example, is a well-known technology that can resolve this inconvenience. The communication controlling apparatus controls communication with an Internet facsimile apparatus connecting thereto, according to SMTP, while controlling communication with a server apparatus on a network, according to HTTP (HyperText Transport Protocol). The communication controlling apparatus also converts e-mail data, which is received from the Internet facsimile apparatus, into HTML (HyperText Markup Language) so as to transmit the converted e-mail data to the server apparatus (Refer to Related Art 1).

[Related Art 1] Japanese Patent Laid-open Publication No. 2002-49571

The conventional technology described in Related Art 1 above, allows facsimile communication to be established via port 80 on a network managed by HTTP, even when port 25 is blocked on a route to communication destination. However, this conventional technology requires a groupware network or a groupware server in addition to the above communication apparatus, as it assumes that facsimile communication is performed in a communication environment that originally has the groupware network. Consequently, a lack of such groupware in the communication environment could increase the size of a system to be established, thereby raising the cost.

SUMMARY OF THE INVENTION

The present invention is provided to address the above-described problems in the conventional technology. A purpose of the present invention is to provide an IP communication apparatus and a data transmission method thereof that allow facsimile communication to be easily established without being affected by the port 25 blocking, wherein image data is transferred via a data storage server by a HTTP protocol that uses a port other than port 25, e.g., port 80, while communication based on a signaling protocol (i.e., SIP) is performed with a destination apparatus.

The IP communication apparatus according to the present invention enables facsimile communication by transmitting image data to and from the destination apparatus via the data storage server. The IP communication apparatus includes a call controller, a data transmitter/receiver, and a data transfer manager. The call controller transmits and receives a call connection message to and from the destination apparatus via a call connection server. The data transmitter/receiver transmits and receives image data to and from the data storage server. The data transfer manager exchanges information to manage the transmission of the image data to and from the destination apparatus, by adding predetermined information to the call connection message.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 (*b*) is a perspective view of the IFAX;

FIG. 7 is a sequence diagram illustrating a communication process in the IP communication system;

FIG. 8 (*a*) and FIG. 8 (*b*) illustrate details of a SIP message;

FIG. 9 illustrates details of a SIP message;

FIG. 10 illustrates details of a SIP message; and

FIG. 11 illustrates details of a SIP message.

DETAILED DESCRIPTION OF PREFERRED EMBODIMENTS

Figure 1:
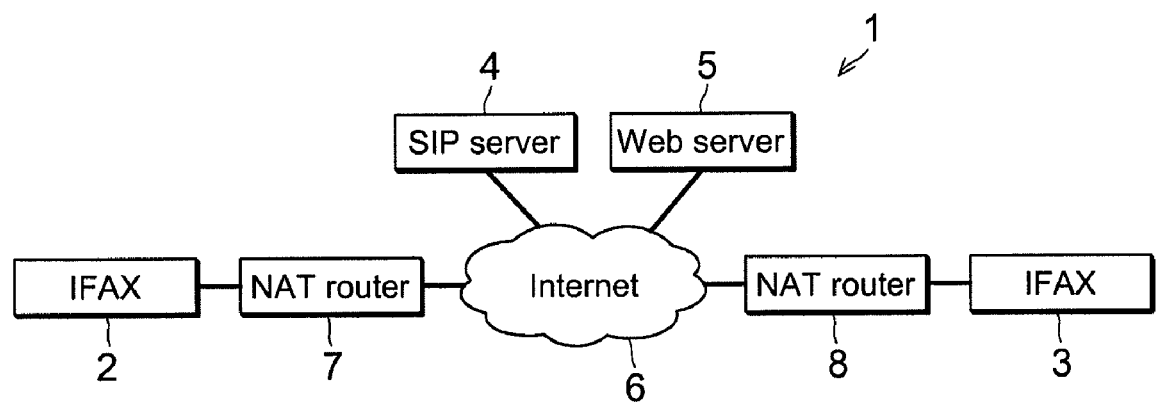
FIG. 1 is a configuration diagram of an IP communication system that includes an IP communication apparatus according to the present embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A first aspect of the present invention provides an IP communication apparatus that enables facsimile communication by transmitting image data to and from a destination apparatus via a data storage server. The IP communication apparatus includes a call controller, a data transmitter/receiver, and a data transfer manager. The call controller transmits and receives a call connection message to and from the destination apparatus via a call connection server. The data transmitter/receiver transmits and receives the image data to and from the data storage server. The data transfer manager, by adding predetermined information to the call connection message, exchanges information to manage the transmission of the image data to and from the destination apparatus.

The configuration above allows facsimile communication to be easily established without being affected by the port 25 blocking. The image data is transferred via the data storage server by using a port other than port 25, e.g., port 80 and the like, while communication based on a signaling protocol is performed with the destination apparatus.

A second aspect of the present invention allows the data transmitter/receiver to add to the call connection message, information on a storage location of the image data that has been transmitted to the data storage server.

When a source apparatus is a transmitting apparatus, the configuration above allows the source apparatus to easily notify a destination apparatus of the storage location of the image data. In addition, the destination apparatus can obtain the image data by accessing the data storage server, based on the information indicating the storage location of the image data. Consequently, NAT traversal issues can be prevented even when the IP communication apparatus is connected under a NAT router.

A third aspect of the present invention allows the data transmitter/receiver to add to the call connection message, a wait instruction that causes the destination apparatus to temporarily stop communication.

When a source apparatus is a receiving apparatus, the configuration above allows the image data to be transferred with certainty, as the source apparatus can stop communication with a destination apparatus depending on the condition of reception of the image data or processing thereof.

A fourth aspect of the present invention allows the data transmitter/receiver to transmit or receive the image data on a page-by-page basis.

A fifth aspect of the present invention allows all the image data to be recorded with certainty, as the call controller ends a session established through transmission and reception of the call connection message after all the image data are recorded by the destination apparatus.

A sixth aspect of the present invention includes a first communication apparatus, a second communication apparatus, a call connection server, and a data storage server. The call connection server controls a call connection by transmitting and receiving a call connection message between the first and second IP communication apparatuses. The data storage server receives image data from the first and second IP communication apparatuses. Then, the data storage server in turn transmits a storage location of the stored image data to the first and second IP communication apparatuses and transmits the stored image data according to a request from the first and second IP communication apparatuses. To enable the second IP communication apparatus to obtain the stored image data, the first IP communication apparatus transmits the image data to the data storage server and transmits to the second IP communication apparatus via the call connection server, the call connection message to which the storage location received from the data storage server is added. The second IP communication apparatus obtains the stored image data from the data storage server according to the call connection message.

A seventh aspect of the present invention provides a data communication method used between a first and second IP communication apparatuses to enable facsimile communication by transmitting image data via a data storage server. According to the data communication method, a transmitting the image data from the first IP communication apparatus to the data storage server; transmitting the storage location of the image data from the data storage server to the first IP communication apparatus; transmitting from the first IP communication apparatus to the second IP communication apparatus, a call connection message to which the storage location received from the data storage server is added; and transmitting the image data from the data storage server according to the call connection message.

The embodiments of the present invention are explained in the following, with reference to the above-described drawings.

FIG. 1 is a configuration diagram of an IP communication system that includes an IP communication apparatus according to the present embodiment. IP communication system 1 includes a plurality of IFAXes (Internet facsimile apparatuses) 2 and 3, SIP server 4 that has a function of a call connection server, and Web server 5 that has a function of a data storage server, which are mutually connected via Internet 6 as an IP network.

IFAXes 2 and 3 are connected to Internet 6 via NAT (Network Address Translation) routers 7 and 8, which have a NAT function. IFAXes 2 and 3 have an image data transfer function to enable facsimile communication via Internet 6 (Hereinafter simply referred to as "data transfer function"). A receiving IFAX can regenerate the received image data and record it on a recording paper or the like. In addition, IFAXes 2 and 3 function as a UAC (User Agent Client) of SIP (Session Initiation Protocol), and mutually transmit and receive a SIP message (a call connection message) via SIP server 4. The transmission and reception of the SIP message allow IFAXes 2 and 3 to exchange information for managing the image data transfer in the facsimile communication performed between IFAXes 2 and 3. Subsequently, each of IFAXes 2 and 3 transmits a Web mail from its Web mail account to a destination Web mail account according to procedures of Web server 5 and the Web mail based on HTTP, so as to transfer the image data. A use of NAT router 7 is not mandatory in this embodiment and thus can be omitted.

SIP server 4 functions as a UAS (User Agent Server) of SIP. SIP server 4 provides a proxy server function that relays a SIP message for a call connection between IFAXes 2 and 3 in response to a request from IFAXes 2 and 3. SIP server 4 also provides a registrar function that manages (registers on, updates on, deletes from a location server, and performs other functions) information, such as global addresses, port numbers, NAT types, and the like, associated with IFAXes 2 and 3.

Web server 5 has the Web mail accounts for IFAXes 2 and 3 respectively set up thereon. Web server 5 transfers image data transmitted from IFAX 2 to IFAX 3, or transfers image data transmitted from IFAX 3 to IFAX 2, via the IFAX 2 Web mail account, the IFAX 3 Web mail account, and Internet 6. When transmitting the image data from IFAX 2 to IFAX 3, the transmitting IFAX 2 transmits the image data by HTTP to the IFAX 2 Web mail account set on Web server 5. Web server 5, according to the Web mail procedure, stores the image data, which is transmitted to the IFAX 2 Web mail account, in a folder in the IFAX 3 Web mail account. A re-INVITE message transmitted from the transmitting IFAX 2 triggers the receiving IFAX 3 to transmit a request to obtain the data by HTTP to Web server 5. IFAX 3 thereby obtains the image data stored in the IFAX 3 Web mail account via Internet 6. When transmitting the image data from IFAX 3 to IFAX 2, the above process is reversed.

Figure 2A:
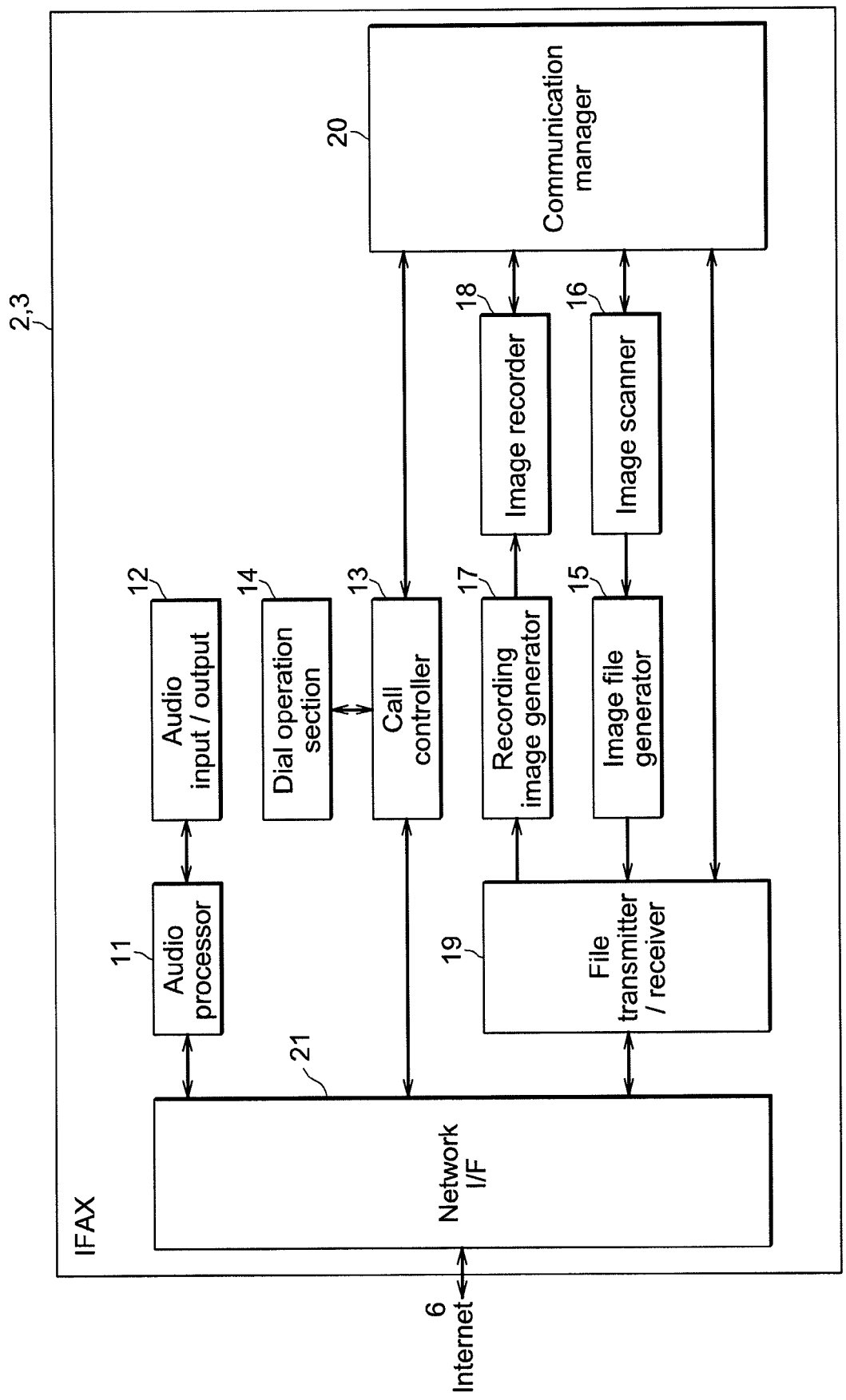
FIG. 2 (*a*) is a function block diagram of an IFAX in the present embodiment.
Figure 2B:
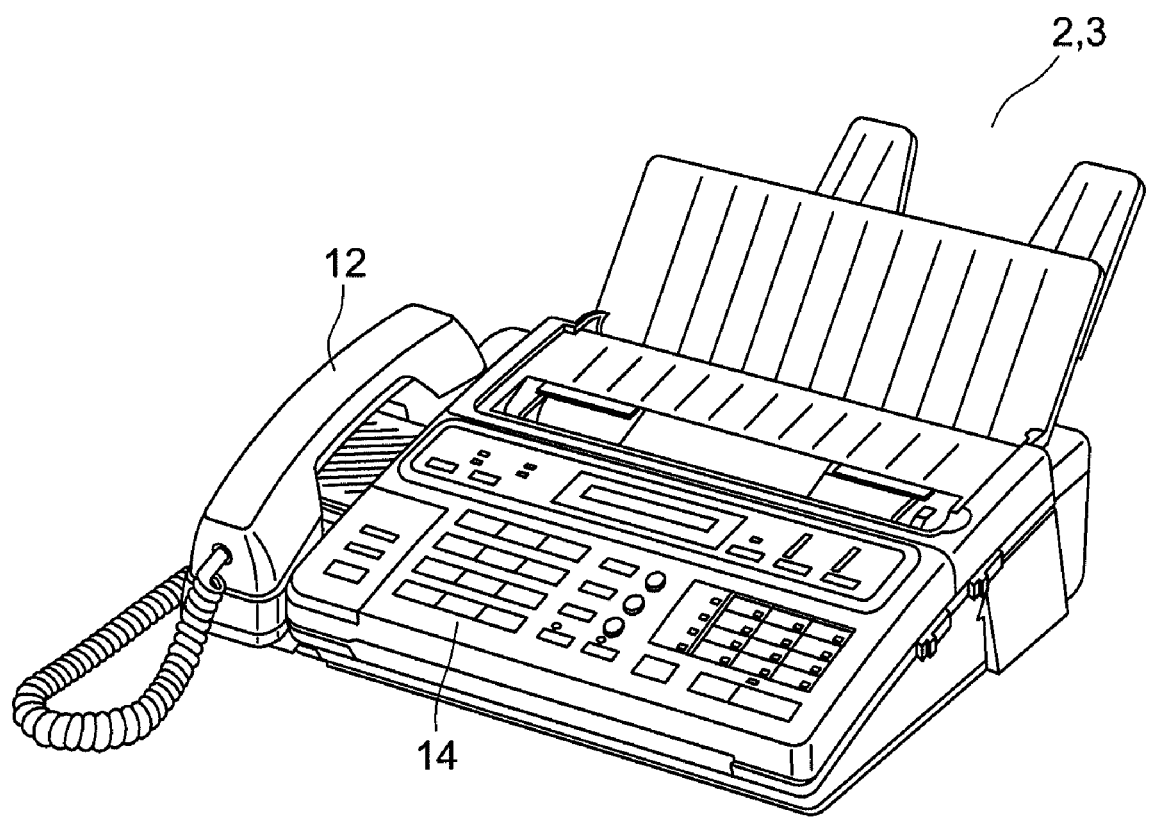

FIG. 2 (a) is a function block diagram of the IFAX illustrated in FIG. 1. FIG. 2 (b) is a perspective view of the same. IFAXes 2 and 3 have audio processor 11, audio input/output section 12, call controller 13, dial operation section 14, image file generator 15, image scanner 16, recording image generator 17, image recorder 18, file transmitter/receiver (data transmitter/receiver) 19, communication manager (data transfer manager) 20, and network I/F (interface) 21.

Audio processor 11 performs a voice communication related process that is performed with a destination apparatus based on VoIP (Voice over Internet Protocol). Audio processor 11 has A/D and D/A conversion functions for transmitted and received data, and an audio codec function based on a predetermined audio encoding method (e.g., ITU-T recommendation G. 711, G. 729, and the like). Audio processor 11 converts analog signals into digital data and encodes the data for transmission, the analog signals being input from audio input/output section 12 that includes a voice transmitter/receiver. Audio processor 11 also decodes and converts the received encoded data so as to generate analog signals, and outputs the signals to audio input/output section 12. Call controller 13 performs a signaling process for establishing a session while exchanging SIP messages with the destination apparatus via SIP server 4, according to user's operation on dial operation section 14.

Image file generator 15 generates a file for transmission from image data, which image scanner 16 generates by optically scanning an image on an original document. When the original document contains a plurality of pages, a plurality of files are generated: one file per page in the original document. Recording image generator 17 generates image data for recording out of a file (image data) received from the destination apparatus. Image recorder 18 forms an image on a recording paper based on the recorded image data.

File transmitter/receiver 19 has a function of a Web browser and performs transmission/reception of the image data file through HTTP-based communication with Web server 5. When IFAX 2 is the apparatus transmitting image data, file transmitter/receiver 19 of IFAX 2 transmits the image data and an HTTP request (POST) to the IFAX 2 Web mail account registered on Web server 5. The transmitted image data is then transmitted from the transmitting IFAX 2 Web mail account to the receiving IFAX 3 Web mail account based on Web mail procedures, so as to be stored in a folder of the IFAX 3 Web mail account. A re-INVITE message transmitted from IFAX 2 to IFAX 3 triggers file transmitter/receiver 19 of the receiving IFAX 3 to transmit an HTTP request (GET) to the IFAX 3 Web mail account on Web server 5. IFAX 3 thereby obtains the image data file stored in the IFAX 3 Web mail account.

Communication manager 20 manages transfer of an image data file by exchanging information for managing the data transfer with the destination apparatus. An addition of predetermined information to a SIP message enables Communication manager 20 to exchange the information. More specifically, communication manager 20 exchanges with the destination apparatus, capability information associated with the file transfer function and information indicating start and end of the data transfer. The capability information associated with the file transfer function includes, for example, a Web server address, a Web mail address of the source apparatus, availability of the file transfer function, the file format, the image size, and color or black-and-white. The capability information and information indicating start and end of the data transfer are exchanged by using an SDP (Session Description Protocol) description document on the SIP message. Communication manager 20 further provides a wait instruction so as to cause the destination apparatus to wait (temporarily stop communication) depending on the condition of reception of the image data and processing thereof on the source apparatus. Communication manager 20 exchanges the wait instruction information (e.g., wait time) with the destination apparatus by using the SDP description document on the SIP message, similar to the process above. Communication manager 20 also performs a process for causing the source apparatus to wait according to the wait instruction from the destination apparatus.

Network I/F 21 is connected to the Internet 6 via a LAN and the like (not shown in the drawings), in order to transmit to and receive from the destination apparatus, a SIP message and an image data packet, based on a predetermined communication protocol.

Hereinafter, an apparatus transmitting image data is refereed to as a transmitting IFAX and an apparatus receiving image data is referred to as a receiving IFAX, with respect to IFAXes 2 and 3. The data transfer functions of these apparatuses are described below.

Figure 3:
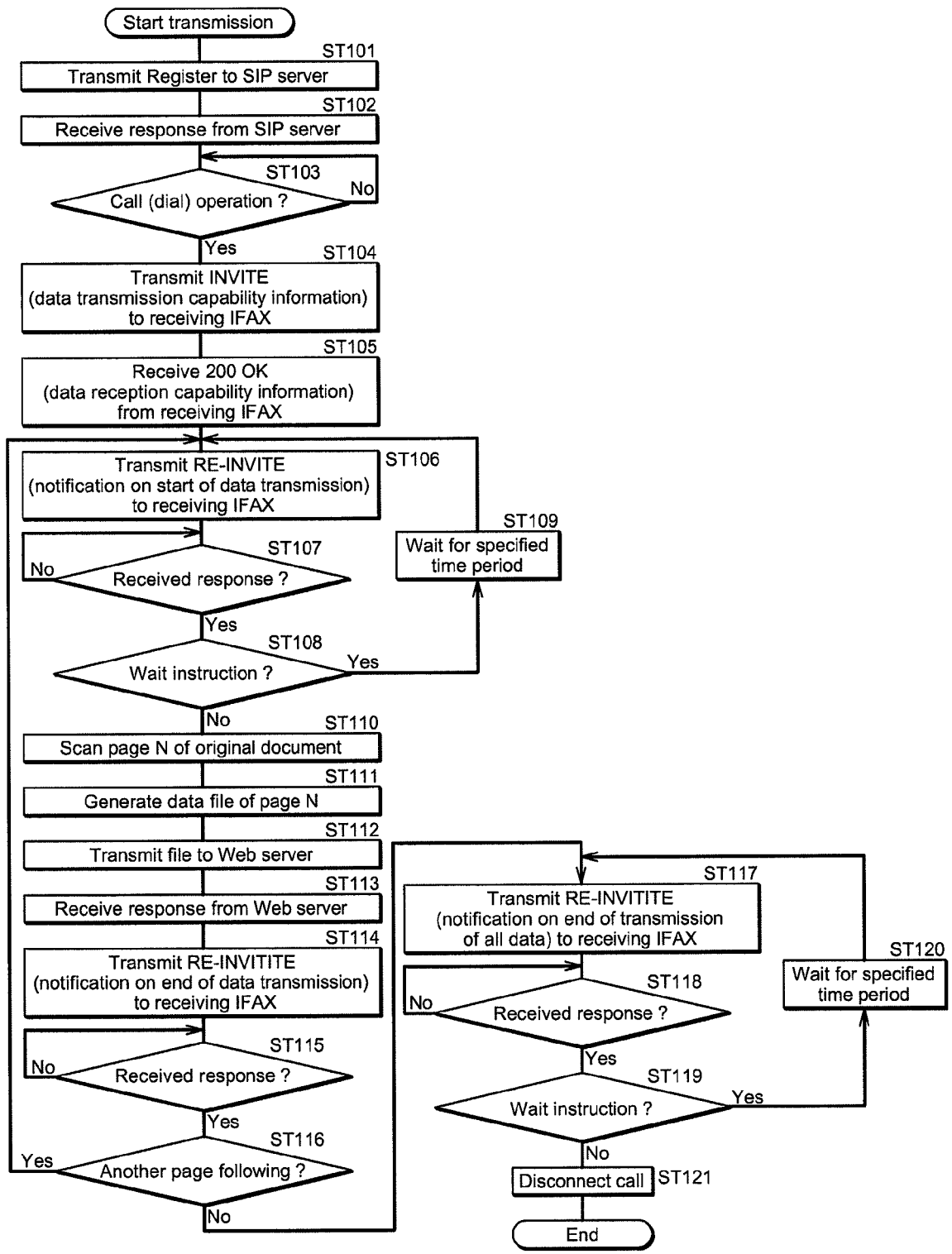
FIG. 3 is a flowchart illustrating operations of the IFAX that transmits image data.

FIG. 3 is a flowchart illustrating operations of the IFAX that transmits image data to the destination IFAX.

The transmitting IFAX first transmits a REGISTER message to SIP sever 4 after start up (ST 101). Reception of a response to the REGISTER message (ST 102) allows the transmitting IFAX to register location information and the like on SIP server 4. Once a user enters a destination number of the receiving IFAX from dial operation section 14 (ST 103: Yes), SIP server 4 confirms communication between the transmitting IFAX and the receiving IFAX. Then, the transmitting IFAX, by using communication manager 20, adds information on the data transfer (transmission) capability of the transmitting IFAX to an INVITE message, and causes call controller 13 to transmit the INVITE massage to the receiving IFAX (ST 104). The data transfer capability information includes, for example, a Web server address, a Web mail address of the source IFAX, availability of the file transfer function, the file format, the image size, and color or black-and-white. When adding a variety of information to the SIP message, communication manager 20 writes predetermined information in a message body of the SIP message as an SDP description document. Subsequently, the transmitting IFAX receives a response to the INVITE message from the receiving IFAX (ST 105). The transmitting IFAX determines whether or not the receiving IFAX is capable of transferring (receiving) the data, based on information included in the message body of the response message.

Next, the transmitting IFAX, by using communication manager 20, adds to the re-INVITE message, information indicating an initiation of data transfer of one page. Then, call controller 13 transmits the re-INVITE message to the receiving IFAX (ST 106). When receiving a response to the re-INVITE message (ST 107: Yes), the transmitting IFAX determines whether or not a message body thereof includes a wait instruction information (ST 108). When determining that the wait instruction information is included, the transmitting IFAX stops communication for a specified time period (ST 109) and returns to ST 106. The receiving IFAX can add to the response message in ST 107, information indicating whether or not the data transfer is accepted.

The transmitting IFAX, by using image scanner 16, scans an image on page N (Page N is the first page of the original document following the pages that have been already scanned) of the original document (ST 110). Then, image file generator 15 generates a file from the image data of the page that has been scanned by image scanner 16 (ST 111). Subsequently, the transmitting IFAX, by using file transmitter/receiver 19, transmits the generated file to Web server 5, which has been notified in the capability information notification in ST 104 (ST 112), and receives a response therefrom (ST 113). The image data transmitted in the present embodiment is not limited to the data consecutively scanned by image scanner 16, and may be the one generated by another apparatus and stored in an external storage medium such as an SD memory and the like.

When receiving a Web mail (attachment file format) from the transmitting IFAX, Web server 5 deletes the stored file (i.e., the file that has already been transferred to the receiving IFAX) so as to store a new file, thereby allowing efficient utilization of memory capacity.

The page-by-page transfer of the image data as described above allows the receiving IFAX to transmit, receive, print, and save the image data on a page-by-page basis, similar to a conventional G3 facsimile apparatus, thereby improving user's convenience. The page-by-page transfer also minimizes the memory capacity for Web server 5 to store image data and the memory capacity for the receiving IFAX to temporarily store the received image data before printing, thereby lowering the cost of the apparatus.

Once a file with an image data attachment is completely stored in the transmitting IFAX Web mail account on Web server 5, the transmitting IFAX, by using communication manager 20, adds to the re-INVITE message, information indicating completion of the data transmission of one page. Then, call controller 13 transmits the re-INVITE message to the receiving IFAX (ST 114). On Web server 5, the Web mail is transferred from the transmitting IFAX Web mail account to the receiving IFAX Web mail account. When receiving a response to the re-INVITE message (ST 115: Yes), the transmitting IFAX determines whether or not more pages of the original document (i.e., the pages that have not yet been transmitted) are following (ST 116). When determining that more pages are following, the transmitting IFAX returns to ST 106.

Meanwhile, when completing transmission of all the pages, the transmitting IFAX, by using communication manager 20, adds to the re-INVITE massage, information indicating completion of the data transmission of all the data. Then, call controller 13 transmits the re-INVITE message to the receiving IFAX (ST 117). When receiving a response to the re-INVITE message (ST 118: Yes), the transmitting IFAX determines whether or not a message body thereof includes a wait instruction information (ST 119). When determining that the wait instruction information is included, the transmitting IFAX stops communication for a specified time period (ST 120), similar to ST 109, and returns to ST 117.

When the transmitting IFAX determines that all the pages have been transmitted and that no wait instruction is provided from the receiving IFAX, the transmitting IFAX disconnects the call and ends the data transmission operations (ST 121).

Figure 4:
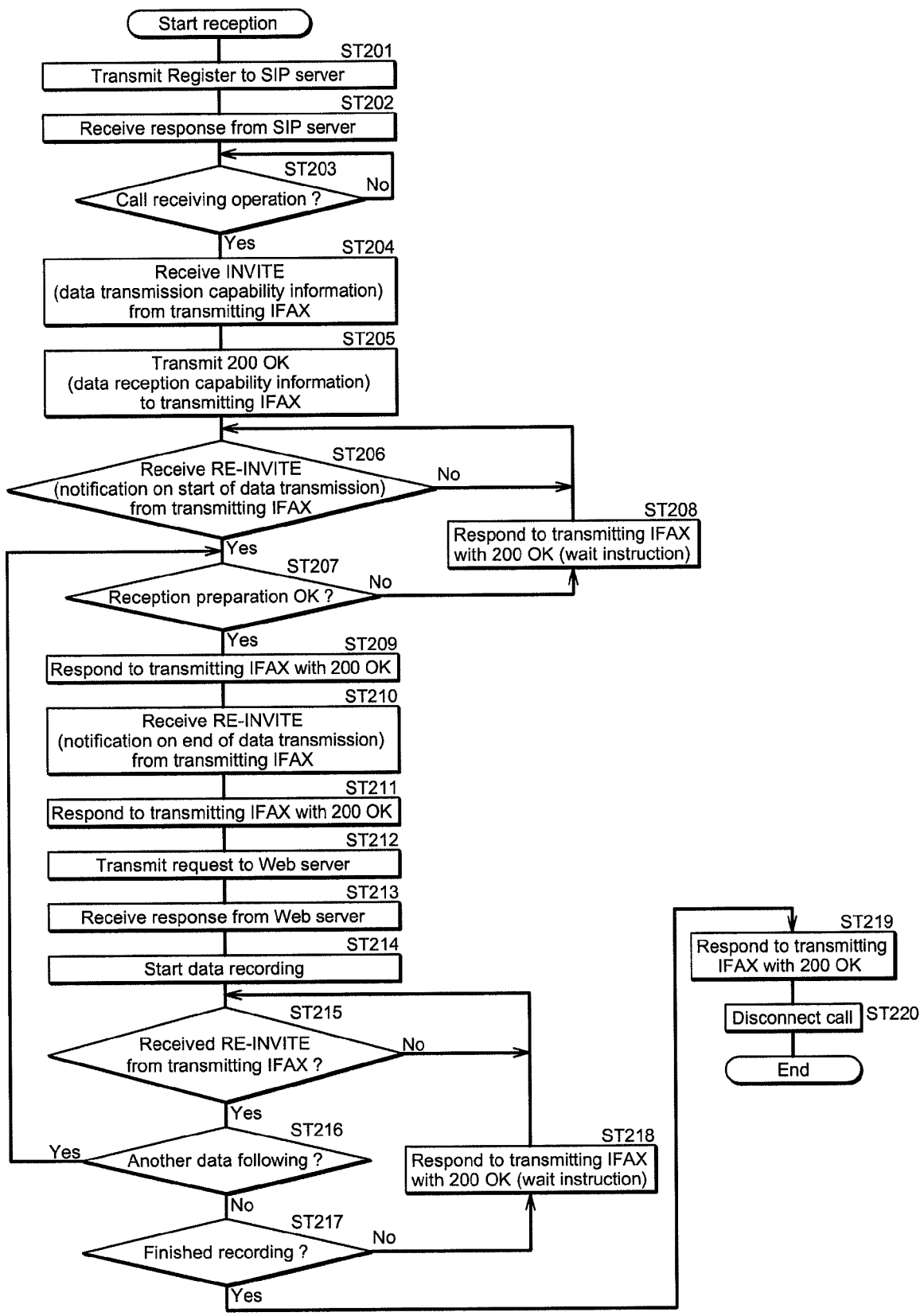
FIG. 4 is a flowchart illustrating operations of the IFAX that receives image data.

FIG. 4 is a flowchart illustrating operations of the IFAX that receives image data from the destination IFAX.

The receiving IFAX first performs a registration process on SIP server 4, similar to ST 101 and ST 102 in FIG. 3 (ST 201, ST 202). When receiving a call from the transmitting IFAX (ST 203: Yes), the receiving IFAX receives an INVITE message from the transmitting IFAX (ST 204). This INVITE message allows the receiving IFAX to obtain the data transfer capability information of the transmitting IFAX (e.g., a Web server address, a Web mail address of the source apparatus, availability of the file transfer function, the file format, the image size, and color or black-and-white). Then, the receiving IFAX, by using communication manager 20, adds its data transfer capability information to a 200 OK message and causes call controller 13 to transmit the 200 OK message to the transmitting IFAX (ST 205).

Subsequently, when receiving a re-INVITE message to which information indicating an initiation of the data transfer of one page is added (ST 206: Yes), the receiving IFAX, by using communication manager 20, determines whether or not preparation for receiving the file is completed (ST 207). When determining that the preparation for receiving the file is not completed for whatever reasons, such as that the receiving IFAX is still in the process of recording the received file and the like, the receiving IFAX, by using communication manager 20, adds to the 200 OK message, a wait instruction including wait time information. Then, the receiving IFAX, by using call controller 13, transmits the 200 OK message to the transmitting IFAX (ST 208) and returns to ST 206. The wait time is set according to the condition of reception of the image data or processing thereof, thereby allowing image data to be transferred with certainty.

When completing the preparation for receiving the file, the receiving IFAX transmits the 200 OK message as a response to the re-INVITE message in ST 206 (ST 209). Then, the receiving IFAX receives from the transmitting IFAX, the re-INVITE message to which the information indicating completion of the data transfer of one page is added (ST 210) and transmits the 200 OK message as a response to the re-INVITE message (ST 211).

The receiving IFAX, by using file transmitter/receiver 19, transmits an HTTP request (GET) to Web server 5 (ST 212), in order to receive an unread Web mail from the transmitting IFAX mail address to its mail account on Web server 5, and receives a response to the HTTP request from Web server 5 (ST 213). The mail account of the receiving IFAX on Web server 5 and the transmitting IFAX mail address have been included in the data transfer capability information.

Since the receiving IFAX obtains the image data file in a Web mail format by accessing Web server 5 as described above, the image data can be transferred without having a NAT traversal issue even when the receiving IFAX is connected to NAT routers 7 and 8. There is a second method that allows an automatic transmission of an image data file from Web server 5 to the receiving IFAX without requiring a request from the receiving IFAX. In this instance, Web server 5 needs to be provided with a function for automatically transmitting the image data file to the transmitting IFAX mail address when the image data is transmitted to the Web server, the transmitting IFAX mail address being included in the data transfer capability information.

Subsequently, the receiving IFAX, by using recording image generator 17, generates recording image data from the received file. Then, image recorder 18 forms an image on a recording paper based on the recording image data (ST 214).

When receiving the re-INVITE message from the transmitting IFAX (ST 215: Yes), the receiving IFAX determines whether or not more data is following (ST 216), based on the information added to the re-INVITE message. When determining that more data is following, the receiving IFAX returns to ST 207.

Meanwhile, when no data is following, the receiving IFAX determines whether or not image recorder 18 has completed recording the image data (ST 217). When the recording of the image data has not yet been completed, the receiving IFAX, similar to ST 208, transmits the 200 OK message, to which a wait instruction is added, to the transmitting IFAX (ST 218) and returns to ST 215. When the recording of all the image data is completed, the receiving IFAX transmits the 200 OK message as a response to the re-INVITE message in ST 215 (ST 219) and disconnects the call so as to end the data transmission operations (ST 220).

Figure 5:
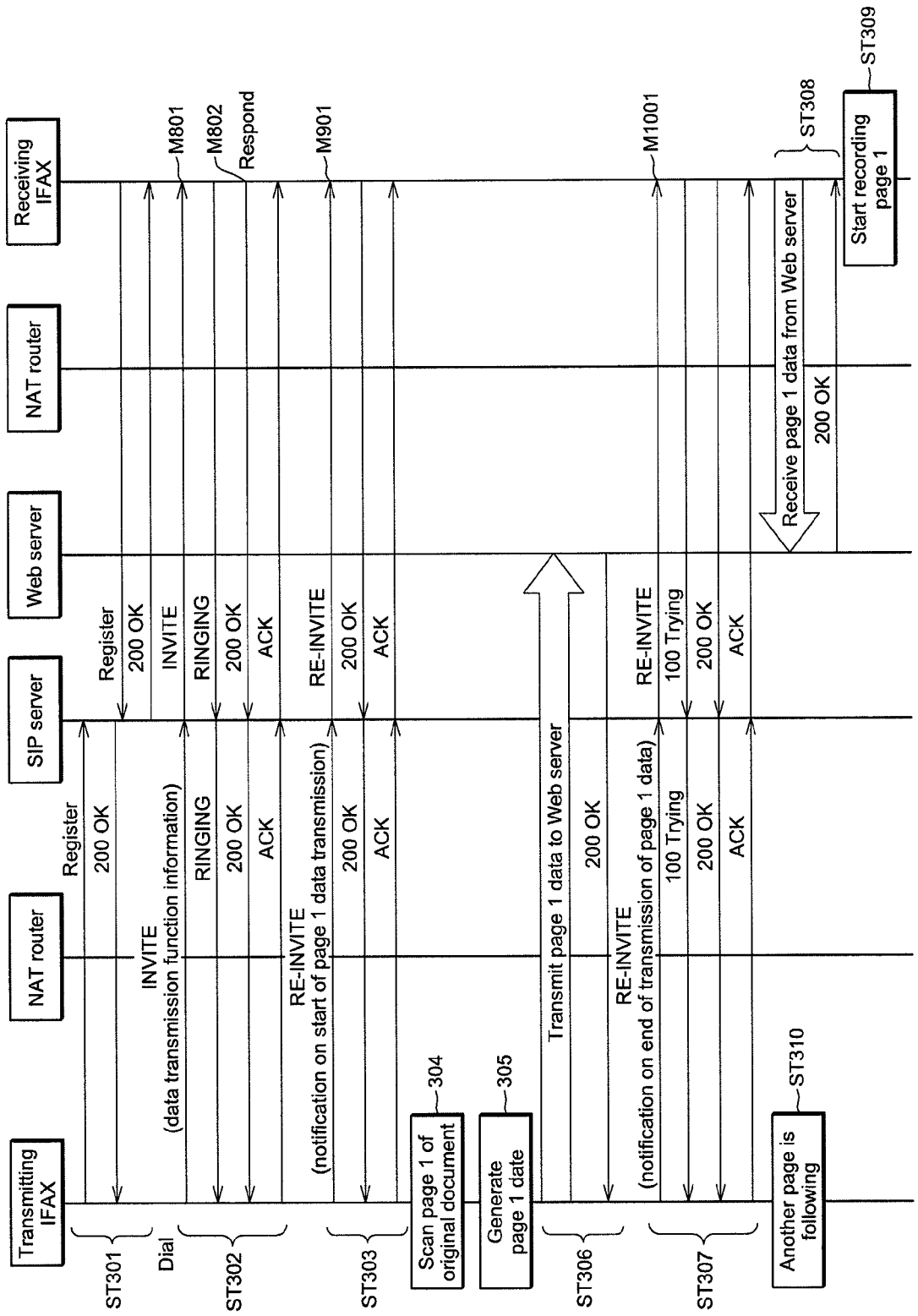
FIG. 5 is a sequence diagram illustrating a communication process in the IP communication system.
Figure 6:
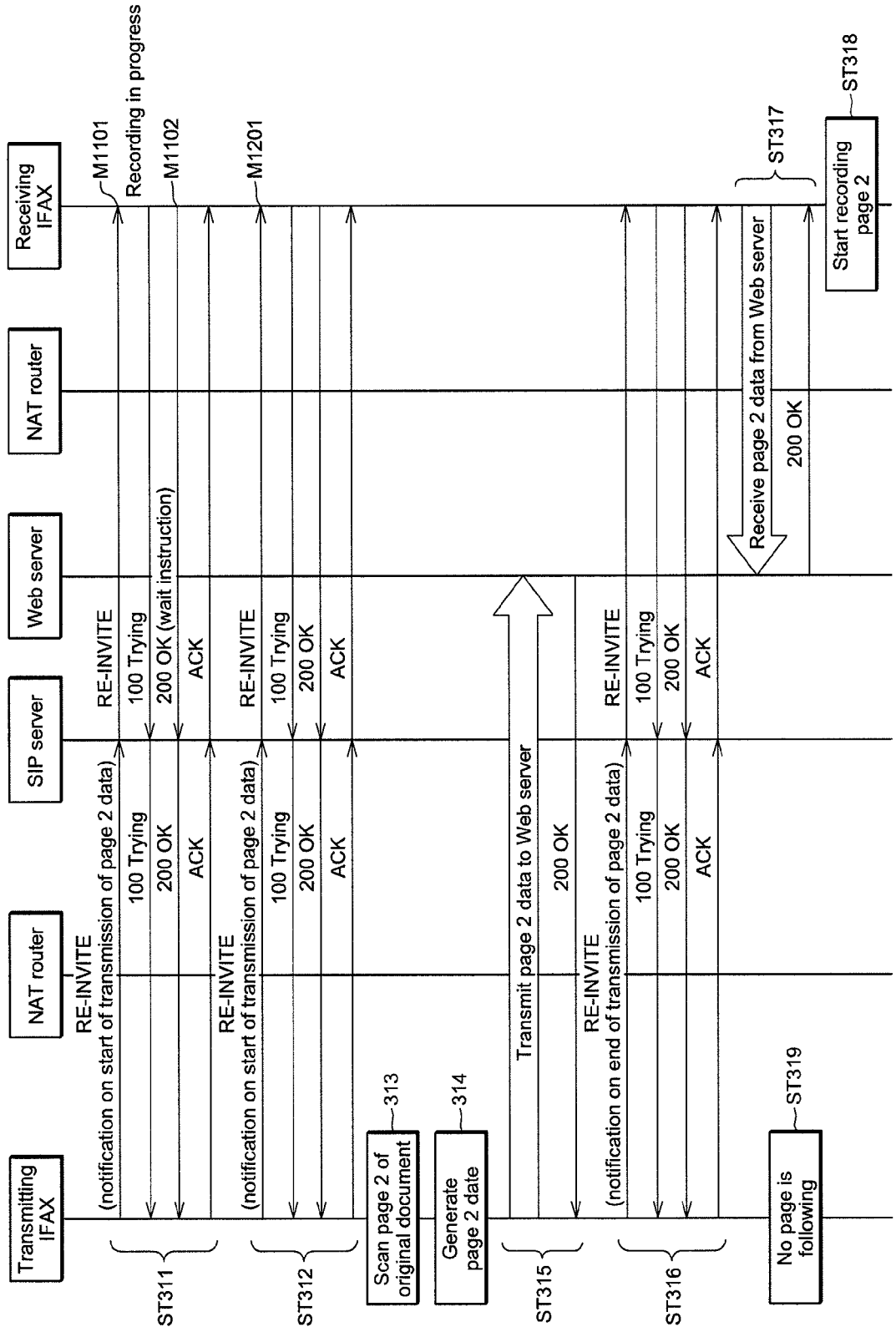
FIG. 6 is a sequence diagram illustrating a communication process in the IP communication system.

FIGS. 5 to 7 are sequence diagrams illustrating communication processes in the IP communication system shown in FIG. 1. FIGS. 5 to 7 illustrate exemplary situations in which image data of an original document including two pages (page 1 and page 2) is transferred as a file on a page-by-page basis. FIGS. 5 to 7 are a series of processes, in which FIG. 5 shows a process through transfer of the first page; FIG. 6 shows a process through transfer of the second page; and FIG. 7 shows a process to end communication after the image data transfer is completed. Details of each SIP message transferred in the processes of FIGS. 5 to 7 are illustrated in FIGS. 8 (*a*) to 11. FIGS. 9 to 11 show only message bodies of the SIP messages, excluding start lines and header sections.

In FIG. 5, the transmitting and receiving IFAXes respectively communicate with SIP server 4 after start up so as to perform a process for registering location information and the like on SIP server 4 (ST 301). Then, the transmitting IFAX dials the destination number of the receiving IFAX and places a call. In this step, the transmitting IFAX transmits an INVITE message M801 to start a session and exchanges a series of SIP messages with the receiving IFAX via SIP server 4 (ST 302).

As shown in FIG. 8 (*a*), message body 31 of the INVITE message M801 includes attribute information 32 associated with a media type "audio" and attribute information 33 associated with a media type "image". By confirming an "m=image" description in message body 31 of the INVITE message, the receiving IFAX can recognize that the transmitting apparatus has the data transfer function. o=1167609649 1167609649 IN IP4 192. 168. 20. 20 and c=IN IP4 192. 168. 20. 20, which are described in attribute information 31, show an IP address of the source IFAX and are used for an audible communication indicated in attribute information 32. Attribute information 33 contains capability information on the image data transfer: "iso_a4 iso_b4" indicates that the original document size is ISO A4 or ISO B4; "tiff" indicates that an encoding format of the image is TIFF (Tagged Image File Format); and "b/w" indicates that the image is in black and white. Attribute information 33 is indicated as merely an example to achieve the data transfer function according to the present invention, and is not pursuant to standard technical specifications (RFC 2327 standard and the like). In addition, "a=url www.ifax.com" is a notification that a host name of the Web server is www.ifax.com. A description of "a=mailaddress ifaxl@ifax.com" is a notification to the destination apparatus that the Web mail account is ifaxl@webmail.com.

These descriptions of attribute information 31, 32, and 33 are indicated as merely examples to achieve the data transfer function according to the present invention, and are not pursuant to standard technical specifications (RFC 2327 standard and the like).

Further, as shown in FIG. 8 (*b*), message body 34 of the 200 OK message M802 includes attribute information 35, which is similar to attribute information 33 of the INVITE message M801. Attribute information 35 enables the transmitting IFAX to recognize that the receiving IFAX has the data transfer function. The image data transfer capability information includes "iso_a4" that describes the size of the original document. When receiving the capability information, the transmitting IFAX sets the transmitting document size to ISO A4 (Refer to attribute information 42 that will be described in FIG. 9 below).

In FIG. 5 again, the transmitting IFAX next transmits a re-INVITE message M901 to change a session and exchanges a series of SIP messages with the receiving IFAX via the SIP server (ST 303).

As shown in FIG. 9, message body 41 of the re-INVITE message M901 includes attribute information 42. "iso_a4", "tiff", and "b/w" in attribute information 42 are as described above. "a=sendstatus start" indicates that image data transmission of the first page will start. In this instance, the receiving IFAX can add to the 200 OK message in ST 303, information on whether or not the data transfer is accepted.

The transmitting IFAX scans the first page of the original document (ST 304) and generates a file for transmission out of the scanned image data (ST 305). Generation of the file for transmission after exchanging information with respect to data transfer capability allows the image data to be appropriately transferred according to capability of the receiving IFAX. Subsequently, the transmitting IFAX transmits the image data of the first page to Web server 5 (ST 306).

Then, the transmitting IFAX communicates with the receiving IFAX to notify that the data transmission of the first page is completed (ST 307).

The receiving IFAX accesses Web server 5 to receive the transmitted file in the transmitting IFAX mail address that has been included in the data transfer capability information, thereby receiving the image data file of the first page (ST 308). Subsequently, the receiving IFAX generates recording image data out of the received file for recording and forms an image on a recording paper based on the recording image data (ST 309).

Meanwhile, when confirming that more pages of the original document are following (ST 310), the transmitting IFAX transmits a re-INVITE message M1101 as shown in FIG. 6 and exchanges a series of SIP messages with the receiving IFAX (ST 311). A message body of this re-INVITE message M1101 concerns the second page of the image data file. Since the attribute information included in the message body of the re-INVITE message M1101 is identical to that of the re-INVITE message M901, details of the message M1101 are not shown in the drawings.

Since the receiving IFAX performs the recording process ST 309 independently from communication with the transmitting IFAX, the receiving IFAX could be still in the recording process ST 309 when receiving the re-INVITE message M1101 from the transmitting IFAX. The example below illustrates a situation in which the receiving IFAX is in the recording process when receiving the re-INVITE message M1101. When this happens, the receiving IFAX adds a wait instruction to a 200 OK message M1102 that is a response to the re-INVITE message M1101, so as to cause the transmitting IFAX to wait until the recoding process ST 309 is completed.

As shown in FIG. 10, message body 61 of the 200 OK message M1102 includes attribute information 62. Attribute information 62 contains a setting of "a=sendstatus wait60" that is a wait instruction information indicating that a wait time is 60 seconds. When receiving the wait instruction, the transmitting IFAX stops transmission for 60 seconds. This wait instruction information can be properly added to a response to any INVITE messages and re-INVITE messages (e.g., M801, M1201, and the like) according to the process conditions of the receiving IFAX.

In FIG. 6 again, when the wait time elapses, the transmitting IFAX transmits again a re-INVITE message M1201 (Details of the message are not shown in the drawings), which is identical to the re-INVITE message M1101 in ST 311, and exchanges a series of SIP messages (ST 312). In this instance, since a 200 OK message from the receiving IFAX does not contain a wait instruction, the transmitting IFAX scans an image on the second page of the original document and generates a file for transmission (ST 313, ST 314), similar to ST 304 and ST 305. Subsequently, the transmitting IFAX transmits the image data file of the second page to Web server 5 (ST 315).

The transmitting IFAX, similar to ST 307, communicates with the receiving IFAX to notify that data transmission of the second page is completed (ST 316). The receiving IFAX receives the image data file of the second page (ST 317), similar to ST 308, and forms an image on a recording paper (ST 318), similar to ST 309.

Meanwhile, when confirming that no page of the original document is following (ST 319), the transmitting IFAX transmits a re-INVITE message M1301 as shown in FIG. 7, and exchanges a series of SIP messages with the receiving IFAX (ST 320).

As shown in FIG. 11, message body 71 of the re-INVITE message M1301 includes attribute information 72. Attribute information 72 contains a setting of "a=sendstatus done" indicating that transmission of all the image data is completed. A 200 OK message 1302 (Details of the message are not shown in the drawings), which is a response to the re-INVITE message M1301, does not contain a wait instruction. When receiving the 200 OK message 1302, the transmitting IFAX determines that the image data transfer is completed and disconnects the call (ST 321).

Although not explained in detail according to the exemplary embodiments, a user name and password need to be set in advance in a Web mail system and in file receiver 19 of an IFAX apparatus in order to log in a mail account on a Web server.

According to the present invention, the IP communication apparatus and the data transmission method thereof allow facsimile communication to be easily established without being affected by the port 25 blocking, since image data is transferred via a data storage server while SIP-based communication is performed with a destination apparatus. Therefore, the IP communication apparatus and the data transmission method thereof are effective for communications over an IP network.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An IP communication apparatus that enables facsimile communication by transmitting and receiving image data to and from a destination apparatus via a data storage server, the IP communication apparatus comprising:
    a call controller that transmits and receives a call connection message to and from the destination apparatus via a call connection server;
    a data transmitter/receiver that transmits and receives the image data to and from the data storage server; and
    a data transfer manager that exchanges information to manage the transmission of the image data to and from the destination apparatus, by adding predetermined information to the call connection message.

2. The IP communication apparatus according to claim 1, wherein
    the data transfer manager adds to the call connection message, information on a storage location of the image data transmitted to the data storage server.

3. The IP communication apparatus according to claim 1, wherein
    the data transfer manager adds to the call connection message, a wait instruction to cause the destination apparatus to temporarily stop communication.

4. The IP communication apparatus according to claim 1, wherein
    the data transmitter/receiver transmits and receives the image data on a page-by-page basis.

5. The IP communication apparatus according to claim 1, wherein
    the call controller ends a session, which has been established by transmitting and receiving the call connection message, after the destination apparatus completes recording all the image data.

6. An IP communication system comprising:
    a first IP communication apparatus;
    a second IP communication apparatus;
    a call connection server that controls a call connection by transmitting and receiving a call connection message between the first and second IP communication apparatuses; and
    a data storage server that stores image data received from the first and second IP communication apparatuses, transmits to the first and second IP communication apparatuses, a storage location of the stored image data, and transmits the stored image data according to a request from the first and second IP communication apparatuses,
    wherein the first IP communication apparatus transmits the image data to the data storage server and transmits the call connection message to the second IP communication apparatus via the call connection server to enable the second IP communication apparatus to obtain the stored image data, the call connection message including the storage location received from the data storage server and
    wherein the second IP communication apparatus obtains the stored image data from the data storage server according to call connection message.

7. A data transmission method used between a first IP communication apparatus and a second IP communication apparatus to enable facsimile communication by transmitting image data via a data storage server, wherein
    transmitting the image data from the first IP communication apparatus to the data storage server,
    transmitting a storage location of the image data from the data storage server to the first IP communication apparatus,
    transmitting a call connection message from the first IP communication apparatus to the second IP communication apparatus, the call connection message including the storage location received from the data storage server,
    transmitting the image data from the data storage server to the second IP communication apparatus according to the call connection message.

* * * * *